Jan. 10, 1961     C. N. BAKER     2,967,555
FOOD CHOPPER
Filed April 28, 1958     2 Sheets-Sheet 1
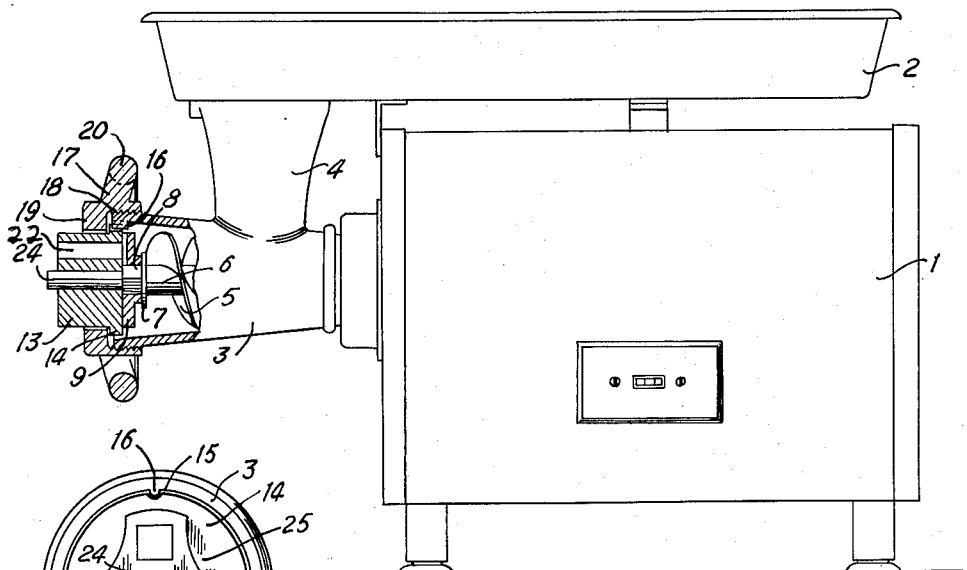
Fig. I
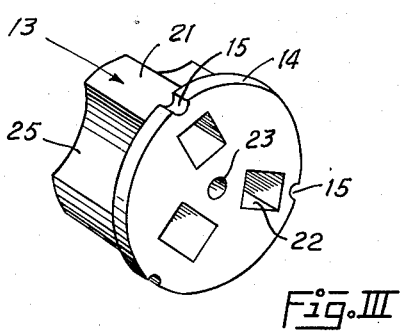
Fig. II
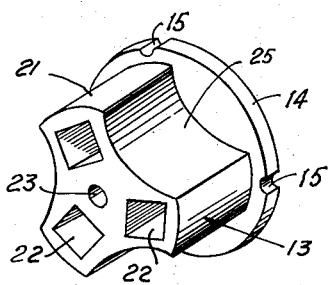
Fig. III
Fig. IV
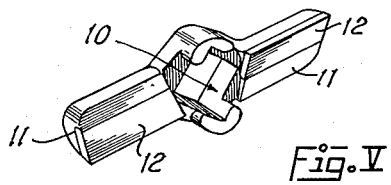
Fig. V
INVENTOR
Charles N. Baker
BY
ATTORNEYS Jan. 10, 1961  C. N. BAKER  2,967,555
FOOD CHOPPER
Filed April 28, 1958  2 Sheets-Sheet 2
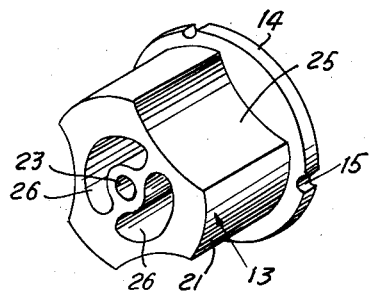
Fig. VI
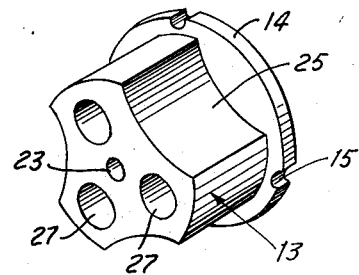
Fig. VII
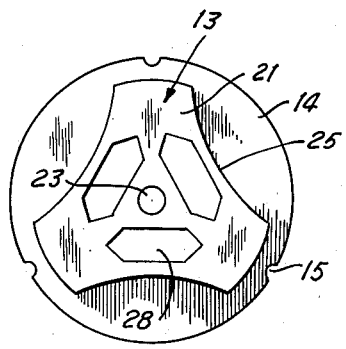
Fig. VIII
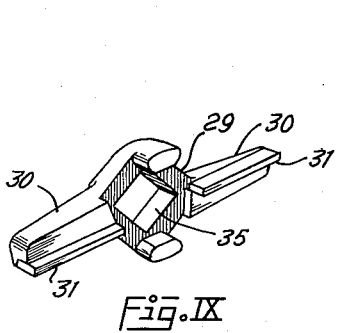
Fig. IX
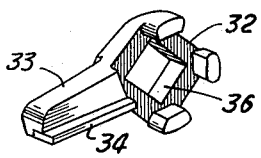
Fig. X
INVENTOR
Charles N. Baker
BY
ATTORNEYS

United States Patent Office 2,967,555
Patented Jan. 10, 1961

2,967,555

FOOD CHOPPER

Charles N. Baker, 2615 Grayson Drive, Dallas, Tex.

Filed Apr. 28, 1958, Ser. No. 731,468

5 Claims. (Cl. 146—189)

This invention is concerned with a food chopper and is particularly concerned with a novel plate and former attachable to a conventional mechanical food chopper against which the blade of the chopper cuts meat or other food into uniform sized portions and then such portions are forced through elongated passages provided in the plate to form them into the shape of the passages.

The improved plate and former, constituting the improvement made by this invention, is primarily intended for cutting and forming meat into uniform sized and shaped pieces, but it will be understood that it can be employed for cutting, shaping and forming other types of food materials.

The improved plate includes an elongated extension thereon which extends beyond the outer end of the auger housing of the food chopper, and such extension has one or more enlarged passages therethrough of desired shape. As the meat or other food is cut or separated into portions by the blade rotating against the inner face of the plate, such portions are forced through such elongated passages, forming them into the shape of the passages.

The plate may be employed for forming meat into clubes or other shapes or it may be employed to form previously ground meat or other food into portions of uniform size and shapes.

The extension on the plate, which extends outwardly beyond the outer end of the auger housing, may be easily grasped for removal of the plate, thus eliminating the possibility that the operator will bring his hand into contact with the rotating blade.

Heretofore meat choppers of the type described herein have included a relatively thin, flat plate against which the meat was chopped, said plate having a plurality of relatively small holes therein and the plate was disposed inside the outer end of the auger housing so that it was difficult to remove same. It was necessary to rotate the blade to kick the plate out so that the operator could grasp it. In many instances workmen have had their fingers mutilated in removing such plates.

Heretofore meat cut into relatively large portions for stew meat, chop suey or other uses has been cut by hand and no satisfactory means, has been provided for mechanically cutting and shaping meat in relatively large size pieces for such purposes. Meat so cut by hand was not cut in uniform shapes and sizes and presented an unsightly appearance when packaged.

The improved plate described herein provides for the cutting of meat by machine into relatively large pieces and forcing it through elongated shaped passages in the plate to form the meat into desired shapes such as square, round, oblong, kidney shaped, and other desired shapes. Meat so cut and formed provides an attractive package in the meat display counter. The plate may also be utilized to form previously ground meat into uniform sized shapes, which eliminates the necessity of manually forming such shaped portions of ground meat or other food. It is especially useful in forming meat balls, lamb patties, salmon patties and the like.

It is therefore the primary object of this invention to provide means on a mechanical food chopper to cut and form relatively large pieces or portions of meat or other food into uniform sizes and shapes.

Another object of the invention is to provide a plate for a mechanical food chopper which has an extension thereon extending beyond the outer end of the auger housing which may be easily grasped for the purpose of removing the plate without the danger of coming into contact with the rotating blade.

Other and further objects of the invention will become apparent upon reading the detailed specification hereinafter following and by referring to the drawings annexed hereto.

Preferred embodiments of the invention are shown in the attached drawings in which:

Figure I is a side elevational view of a conventional motor driven food chopper showing the outer end of the auger housing and the improved shaper plate, mounted therein, sectionalized to show the construction and mounting thereof;

Figure II is an enlarged end elevational view of the auger housing with the shaper plate mounted therein before placing the hold down nut thereon;

Figure III is an enlarged perspective view of a shaper plate taken from the inner end thereof, said shaper plate having square passages therethrough;

Figure IV is an enlarged perspective view of the shaper plate shown in Figure III, taken from the outer end thereof;

Figure V is an enlarged perspective view of a suitable form of blade used with the shaper plate;

Figure VI is an enlarged perspective view of another shaper plate taken from the outer end thereof, said shaper plate having kidney shaped passages therethrough;

Figure VII is an enlarged perspective view of another shaper plate having round passages therethrough;

Figure VIII is an enlarged end view of a still further form of shaper plate having substantially diamond shaped passages therethrough, said view being of the outer end thereof:

Figure IX is an enlarged perspective view of another form of blade which may be employed with the shaper plate;

Figure X is an enlarged view of a still further form of blade which may be used with the shaper plate, said blade having a single wing thereon for cutting meat or other food into larger portions.

Numeral references are employed to designate the various parts shown in the drawings and like numerals indicate like parts throughout the various figures of the drawings.

Referring first to Figure I, the numeral 1 indicates a housing for a motor driven food chopper, in which housing an electric motor (not shown) is mounted for rotation of the auger shaft and blade. A loading tray 2 is mounted on the upper side of the housing 1 on which meat or other food to be chopped and formed is deposited. An auger housing 3 extends from the end of the housing 1, said auger housing being connected to the loading tray by a hollow hopper 4 through which the meat or other food is fed to the auger housing from the loading tray.

An auger 5 is mounted on the shaft 6 for rotation in the auger housing 3, sadi shaft being rotatable by the motor disposed in the housing 1.

An annular flange 7 is secured to the shaft 6 and such shaft has a square portion 8 thereon adjacent to the flange 7.

A blade 9, a suitable form of which is shown in Figure V, has a square passage 10 therethrough which slips over the square portion 8 on the shaft 6 so that the blade will rotate with the shaft.

The blade 9 has oppositely disposed wings 11 thereon on the outer faces of which are disposed the cutting edges 12.

The improved shaper plate, which includes a body, indicated generally at 13, has an annular flange 14 on the inner end thereof in which flange are formed a plurality of key slots 15. The key slots 15 are arranged to register with keys 16 formed on the inner side of the auger housing 3 when the shaper plate 13 is inserted therein, in order to hold the shaper plate 13 against rotation.

After the shaper plate 13 has been inserted in the outer end of the auger housing 3 a hold down nut 17 is threadedly engaged to the outer side of the auger housing 3 by means of companion threads 18. An inwardly extending flange 19 is provided on the hold down nut 17 to engage the flange 14 on the shaper plate 13 in order to hold the shaper plate in the auger housing.

An annular handle 20 is provided on the hold down nut 17 to permit ease in handling and positioning the hold down nut in the housing 3.

The shaper plate 13, one form of which is shown in Figures III and IV, includes an elongated extension 21 thereon having a plurality of relatively large, square passages therethrough. A circular hole 23 is provided centrally through the shaper plate 13 for slidable insertion over a complementary reduced extension 24 on the auger shaft 6. The plate 13 is held against rotation by the keys 16 and key slots 15 but the shaft extension 24 may rotate in the hole 23.

Flutes or channels 25 are formed on the outer side of the elongated extension 21 for the purpose of permitting ease in grasping the shaper plate 13 for removal from the housing 3. It will be noted that when the shaper plate 13 is disposed in the outer end of the housing 3, as shown in Figure I, the elongated extension 21 extends outwardly beyond the housing so that it may be easily grasped for removal after the hold down nut 17 has been removed.

When assembled as shown in Figure I the blade 9 is abutted against the flange 7 and the cutting edges of the blade are rotatable against the inner face of the shaper plate 13 so that as meat or other food is forced outwardly through the auger housing 3 by the auger 5 it will be cut into uniform portions by the blade 9 against the inner face of the shaper plate 13. After the food is cut it is forced through the passages 22 and such elongated passages shape the portions of chopped food into cubes. The blade 9, having only two wings thereon, will cut meat or other food into relatively large pieces and such pieces will be shaped into cubes as it is forced through the square passages 22, making attractive pieces for packaging. Previously ground meat or other food may also be forced through the passages 22 in order to shape it into cubes, the blade 9 dividing the ground meat or other food into uniform sized portions.

The shaper plate 13 may be provided with elongated passages therethrough of any desired shape for forming meat or other food into such shapes.

For instance in Figure VI the passages 26 are kidney shaped, in Figure VII the passages 27 are round and in Figure VIII the passages 28 are substantially elongated, diamond shaped. With the exception of the shape of the passages in these modified shaper plates the construction and function of the shaper plate is the same as that described in connection with Figures III and IV.

In Figure IX there is shown a modified form of blade which may be employed in conjunction with the shaper plate 13. Such blade has oppositely disposed wings 30 thereon with outwardly extending, flat-sided cutting edges 31.

In Figure X is shown still another modified form of blade 32 which may be used in conjunction with the shaper plate 13, such blade having a single wing 33 thereon with a flat sided cutting edge 34. By employing such blade, meat or other food may be cut and divided into larger portions and forced through the shaped passages in the plate 13.

Each of the modified blades 29 and 32 has a square passage 35 and 36, respectively, therethrough for fitting over the square portion 8 of the auger shaft 6, so that the blade will rotate with the shaft.

It will be seen that I have provided an improved cutting and shaping plate for a food chopper which forms portions of meat or other food, cut thereagainst and forced therethrough, into uniform shapes and sizes, and which plate may be easily removed from the auger housing without the danger of the hand coming into contact with the blade which rotates against the inner side of the plate.

It will be understood that other and further forms of my invention may be devised without departing from the spirit and scope of the appended claims.

I claim:

1. In a food chopper of the class having an auger housing, an auger shaft rotatably disposed in the housing, an auger mounted on the shaft, a blade keyed to the shaft, longitudinal keys formed on the inner side of the housing, a shaper and chopper plate having an annular flange on one end thereof, key slots in the outer periphery of the flange registerable with the keys in the housing, a central round hole extending longitudinally of the shaper plate and slidable over the outer end of the shaft, a hold down nut threadedly engaged with the housing and having a part thereon engagable with the flange on the plate to hold the plate in the housing, the combination with the foregoing of an elongated reduced extension on the shaper plate extending outwardly of the housing and the hold down nut; and a plurality of radially disposed passages extending longitudinally through the reduced extension of the plate, the blade being rotatably positioned against the flanged end of the plate.

2. The combination called for in claim 1 wherein the blade has two oppositely disposed wings thereon.

3. The combination called for in claim 1 wherein the blade has one wing thereon.

4. In a food chopper of the class having an auger housing, an auger shaft rotatably disposed in the housing, an auger mounted on the shaft, a blade attached to the shaft, a shaper and chopper plate having an annular flange on one end thereof, said flange being slidably disposed in the housing, means to prevent rotation of the plate in the housing, a central round hole extending longitudinally of the shaper plate and slidable over the outer end of the shaft, a hold down nut threadedly engaged with the housing and having a part thereon engageable with the flange on the plate to hold the plate in the housing, the combination with the foregoing of an elongated reduced extension on the shaper plate extending outwardly of the housing and the hold down nut; and a plurality of radially spaced passages extending longitudinally through the reduced extension of the plate, the blade being rotatably positioned against the flanged end of the plate.

5. The combination called for in claim 4 wherein a plurality of longitudinal flutes are formed in the outer surface of the elongated extension.

References Cited in the file of this patent

UNITED STATES PATENTS

| | | |
|---|---|---|
| 1,946,740 | Hall | Feb. 13, 1934 |
| 2,049,083 | Schaefer | July 28, 1936 |
| 2,211,842 | Anderson | Aug. 20, 1940 |
| 2,476,695 | Cadella | July 19, 1949 |
| 2,679,874 | Schmidt | June 1, 1954 |
| 2,796,104 | Klod | June 18, 1957 |

FOREIGN PATENTS

| | | |
|---|---|---|
| 17,616 | Great Britain | Sept. 19, 1893 |
| 323,465 | France | Nov. 11, 1902 |
| 427,261 | Italy | Nov. 17, 1947 |